(12) United States Patent
Al-Harthi et al.

(10) Patent No.: US 8,697,821 B1
(45) Date of Patent: Apr. 15, 2014

(54) PRESSURE SENSITIVE ADHESIVE

(71) Applicant: King Fahd University of Petroleum and Minerals, Dhahran (SA)

(72) Inventors: Mamdouh Ahmad Al-Harthi, Dhahran (SA); Omer Yahya Bakather, Dhahran (SA); Sadhan Kumar De, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 13/914,388

(22) Filed: Jun. 10, 2013

(51) Int. Cl.
*C08F 4/70* (2006.01)
*C08F 4/80* (2006.01)

(52) U.S. Cl.
USPC ........ 526/169.1; 526/161; 526/160; 526/172; 526/170; 526/348; 526/931

(58) Field of Classification Search
USPC .............. 526/172, 169.1, 169, 161, 348, 351, 526/352, 931
See application file for complete search history.

(56) References Cited

U.S. PATENT DOCUMENTS

| | | | |
|---|---|---|---|
| 3,220,966 A | 11/1965 | Flanagan | |
| 5,086,134 A | 2/1992 | Antberg et al. | |
| 5,852,145 A * | 12/1998 | McLain et al. | 526/133 |
| 5,880,241 A * | 3/1999 | Brookhart et al. | 526/348 |
| 6,002,034 A * | 12/1999 | McLain et al. | 556/34 |
| 6,232,259 B1 * | 5/2001 | Ittel et al. | 502/155 |
| 6,489,400 B2 | 12/2002 | Khandpur et al. | |
| 6,900,277 B2 | 5/2005 | Eilerts et al. | |
| 7,176,158 B2 * | 2/2007 | Chow et al. | 502/159 |
| 7,888,444 B2 * | 2/2011 | Coates et al. | 526/348 |
| 2004/0010105 A1 * | 1/2004 | Winslow et al. | 526/161 |

OTHER PUBLICATIONS

Pourtaghi-Zahed, H.; Zohuri, G.H. J. Polym. Res. 2012, 19:9996.*
AlObaidi, F.; Ye, Z.; Zhu, S. Polymer, 2004, 45, 6823-6829.*
Johnson, L.K.; Killian, C.M.; Brookhart, M. J. Am. Chem. Soc. 1995, 117, 6414-6415.*
Rose, J.M.; Mourey, T.H.; Slater, L.A.; Keresztes, I.; Fetters, L.J.; Coates, G.W. Macromolecules 2008, 41, 559-567.*
Hamid Pourtaghi-Zahed et al., "Synthesis and characterization of ethylene-propylene copolymer and polyethylene using α-diimine nickel catalysts", J Polym Res (2013), 19:9996, 8 pages.

* cited by examiner

*Primary Examiner* — Rip A. Lee
(74) *Attorney, Agent, or Firm* — Richard C Litman

(57) ABSTRACT

The pressure sensitive adhesive is a copolymer of ethylene and propylene that has a maximum load between 6.4 N and 11.2 N in a lap joint shear strength test. The copolymer is prepared by mixing ethylene and propylene in the presence of a diimine nickel catalyst and polymethylaluminoxane (MAO) co-catalyst. The molar ratio of the ethylene to propylene feed is between 60:40 and 40:60. The polymerization is carried out at 30° C. and 1.3 bar. The polypropylene molar percentage in the resulting copolymer is between 42% and 88%, and the weight average molecular weight is between 24,917 and 33,314 Da. The copolymer is an amorphous polymer having a glass transition temperature ($T_g$) between −63° C. and −66° C.

4 Claims, 9 Drawing Sheets

Experimental conditions and properties of ethylene/propylene adhesive copolymers prepared by in situ copolymerization using diimine catalyst and MAO co-catalyst system system at 1.3 bar[a]

| Entry No. | E/P mol/mol | Poly $C_3H_6$[b] (%) | $T_g$[c] °C |
|---|---|---|---|
| 1. | 60/40 | 42 | -65.56 |
| 2. | 50/50 | 55 | -64.45 |
| 3. | 40/60 | 88 | -63.85 |

[a] Copolymerization conditions: Solvent toluene = 80 mL, Temp = 30°C, Time = 10 mins, Catalyst amount = 7.1 mg cocatalyst amount = 3 ml, [b] Determined by $^{13}$C NMR, [c] Determined by DSC.

*Fig. 1*

GPC analysis of ethylene/propylene adhesive copolymers prepared by in situ copolymerization using diimine catalyst and MAO co-catalyst system at 1.3 bar [a]

| Entry No. | E/P mol/mol | Mw (Daltons) | PDI |
|---|---|---|---|
| 1. | 60/40 | 24,917 | 2.4510 |
| 2. | 50/50 | 27,821 | 1.8390 |
| 3. | 40/60 | 33,314 | 1.7590 |

[a] Copolymerization conditions: Solvent toluene = 80 mL, Temp = 30 °C, Time = 10 mins, Catalyst amount = 7.1 mg, cocatalyst amount = 3 ml.

*Fig. 7*

PRESSURE SENSITIVE ADHESIVE

BACKGROUND OF THE INVENTION

1. Field of the Invention

The present invention relates to adhesives, and particularly to a pressure sensitive adhesive composed of a copolymer of ethylene and propylene.

2. Description of the Related Art

The copolymers of ethylene with higher olefins are vital commercial products. The structure and copolymer composition are supposed to depend on the catalyst characteristics, such as homogeneity and stereospecificity. Studies have found that the physical properties of ethylene-propylene (EP) copolymers are strongly dependent upon the number of chemically inverted propylene units and the monomer sequence distribution.

Ethylene/propylene copolymerization has been carried out by using different catalysts, such Zeigler-Natta catalysts, postmetallocene and metallocene catalysts, and FI catalysts. Recently, diimine nickel and palladium catalysts were found to be promising systems for the homopolymerization and copolymerization of ethylene, producing highly branched, high molecular weight, amorphous or linear semi-crystalline materials due to a chain-walking mechanism. Decreasing the polymerization temperature or pressure resulted in a decrease in the degree of branching and increasing the crystallinity and melting temperature of the resulting polymer A huge increase in activity was obtained when diethylaluminum chloride (DEAC) and 1,3-dichloro-1,3-diisobutyldialuminoxane (DCDAO) were used for ethylene and propylene polymerizations in the presence of Ni(II)-diimine complexes, compared to polymethylaluminoxane (MAO).

Adhesives are substances (either natural or synthetic, and existing as a liquid or semi-liquid) that can be used to bond or adhere objects together. Several mechanisms of adhesion have been proposed, including mechanical interlocking, electronic theory, a theory of boundary layers and interphases, diffusion theory, and chemical bonding theory. Adhesives are classified into different types based on the method of adhesion, such as drying adhesives, contact adhesives, hot adhesives, and pressure sensitive adhesives. There are many types of polymeric adhesives, including natural rubber, polysulfide, polyurethane, polyvinyl acetate, ethylene-vinyl acetate, unsaturated polyester, and epoxy. Adhesives are used in the wood industry, the electronics industry, drug delivery, dentistry, and the automotive industry.

Pressure sensitive adhesives, or PSAs, are adhesives that are able to form bonds on surfaces by the application of light pressure. No heat, solvent, or water is required to stimulate the adhesive. They are classified into three major products, namely, solvent-based, water-based, and hot melt.

Thus, a pressure sensitive adhesive solving the aforementioned problems is desired.

SUMMARY OF THE INVENTION

The pressure sensitive adhesive is a copolymer of ethylene and propylene that has a maximum load between 6.4 N and 11.2 N in a lap joint shear strength test. The copolymer is prepared by mixing ethylene and propylene in the presence of a diimine nickel catalyst and polymethylaluminoxane (MAO) co-catalyst. The molar ratio of the ethylene to propylene feed is between 60:40 and 40:60. The polymerization is carried out at 30° C. and 1.3 bar. The polypropylene molar percentage in the resulting copolymer is between 42% and 88%, and the weight average molecular weight is between 24,917 and 33,314 Da. The copolymer is an amorphous polymer having a glass transition temperature ($T_g$) between −63° C. and −66° C.

These and other features of the present invention will become readily apparent upon further review of the following specification and drawings.

BRIEF DESCRIPTION OF THE DRAWINGS

FIG. 1 is a table showing the experimental conditions and properties of ethylene/propylene (E/P) adhesive copolymers prepared by in situ copolymerization using diimine catalyst and MAO co-catalyst system at 1.3 bar for a pressure sensitive adhesive according to the present invention.

FIG. 7 is a table summarizing the results of GPC analysis of the three ethylene/propylene copolymers of the table of FIG. 1.

Similar reference characters denote corresponding features consistently throughout the attached drawings.

DETAILED DESCRIPTION OF THE PREFERRED EMBODIMENTS

Figure 2:
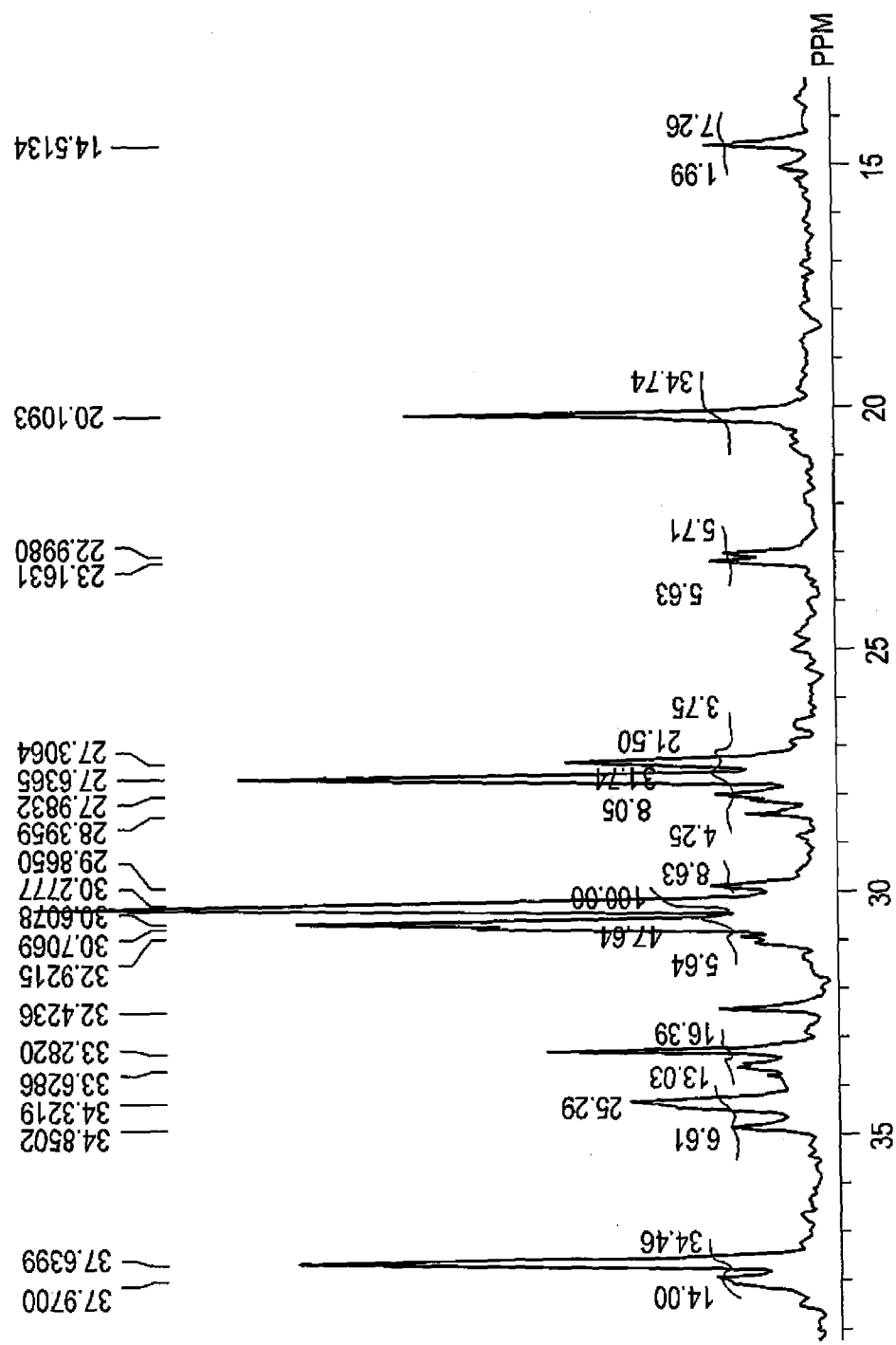
FIG. 2 shows $^{13}C$ NMR spectra of the 60/40 feed molar ratio (E/P) adhesive copolymer of the table in FIG. 1, Entry 1.

The pressure sensitive adhesive is a copolymer of ethylene and propylene that has a maximum load between 6.4 N and 11.2 N in a lap joint shear strength test. The copolymer is prepared by mixing ethylene and propylene in the presence of a diimine nickel catalyst and polymethylaluminoxane (MAO) co-catalyst. The molar ratio of the ethylene to propylene feed is between 60:40 and 40:60. The polymerization is carried out at 30° C. and 1.3 bar. The polypropylene molar percentage in the resulting copolymer is between 42% and 88%, and the weight average molecular weight is between 24,917 and 33,314 Da. The copolymer is an amorphous polymer having a glass transition temperature ($T_g$) between −63° C. and −66° C.

Premixed ethylene and propylene gas mixtures were used to synthesize the pressure sensitive adhesive with three different molar ratios (60:40, 50:50 and 40:60) of ethylene to propylene, respectively. All materials were purchased from Sigma Aldrich and used without additional purification. All manipulations were carried out under $N_2$ using standard Schlenk and glove box techniques.

The diimine nickel catalyst was prepared according to the methods reported in Bahuleyan, B. et al., Macromolecular Research, 2012, 20(7), p. 772-775 and Ittel, S. D. et al., Chemical Reviews, 2000, 100(4), p. 1169-1204, which are hereby incorporated by reference in their entirety.

In particular, the ligand for the catalyst was prepared as follows. A 1:2 ratio of Acenaphthequinone and 2,6-Diisopropylaniline was mixed in methanol, and a few drops of formic acid were added and stirred overnight at 50° C. After the reaction, methanol was removed under vacuum and the resulting product was purified by Column chromatography (ethyl acetate/hexane-silica gel). The solvent was evaporated to get the product and it was dried at 50° C. under vacuum.

The catalyst was then obtained as follows. To a methylene chloride solution of the ligand was added 1:1 equivalent of NiBr2, which was stirred overnight at 60° C. The precipitated product was filtered and washed. Finally, the product was dried under vacuum at 60° C. and a brown color catalyst was obtained, having the following structural formula:

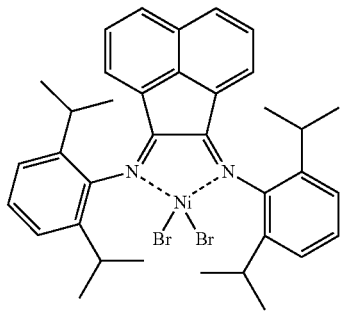

Ethylene/propylene copolymerization was carried out in a 250 mL round-bottom flask equipped with a magnetic stirrer. About 7.1 mg of the diimine nickel catalyst was added to the flask, and the reactor was charged with toluene (80 mL) and nitrogen gas at a pressure of 1.3 bar. Then, the flask was immersed in an oil bath, and when the reactor temperature was equilibrated with bath oil temperature (30° C.), nitrogen gas was removed using a vacuum pump. Then an ethylene/propylene gas mixture was fed into the reactor. After 10 minutes of saturation of ethylene/propylene gas mixture in toluene, 3 ml of the cocatalyst (MAO) was introduced into the reactor to initiate copolymerization. The copolymerization reaction was quenched by adding 250 ml of methanol containing HCl vol. %). Finally, the copolymer was washed with an excess amount of methanol and dried in an oven at 50° C. for 24 hours.

DSC analysis was carried out as follows. The melting temperature ($T_m$) and the glass transition temperature ($T_g$) of the ethylene/propylene adhesive copolymers were measured by differential scanning calorimetry (DSC) using TA instruments Q1000 model number.

CRYSTAF analysis was carried out as follows. Crystallization analysis fractionation (CRYSTAF) (Polymer Char, Spain) of the adhesive copolymers was performed in 1,2,4-trichlorobenzene as a solvent in stainless-steel stirred vessels of 50-ml volume using an IR detector. The crystallization rate was 0.2° C./min.

In addition, $^{13}$CNMR analysis was carried out as follows. $^{13}$CNMR was used to determine the composition of ethylene/propylene (E/P) adhesive copolymer in 1,2,4-trichlorobenzene as a solvent using a Bruker AVANCE III-600.

TDHT-GPC analysis was carried out as follows. The molecular weight of the ethylene/propylene pressure sensitive adhesive was determined by Triple Detection High Temperature Gel Permeation Chromatography (TDHT-GPC) using 1,2,4-trichlorobenzene as a solvent. About 25 mg of the material was placed into a 40 ml glass vial and accurately weighed, and 10 ml of the solvent was added using a clean 10 ml glass pipette. The vial was capped with a Teflon coated cap, and the samples were placed into the Vortex Auto Sampler and left to dissolve for 3 hrs at 160° C. while stirring gently.

Adhesive Lap Joint Shear Strength Tests were carried out as follows. Two specimens, each 70×20 mm, are bonded together with adhesive by applying adhesive over 20×20 mm$^2$ of each aluminum substrate. Then, the specimens were compressed slightly using a Carver 25-ton press by applying a 1000 pound load for 5 minutes to get uniform adhesive coverage. Finally, the test specimens were placed in the grips of a LFPlus universal testing machine and pulled at 5 mm/min using LFPlus universal testing model.

The ethylene/propylene pressure sensitive adhesive copolymers were prepared by in-situ polymerization in the presence of diimine nickel catalyst. FIG. 1 is a table summarizing the results of the copolymerization characteristics.

Figure 3:
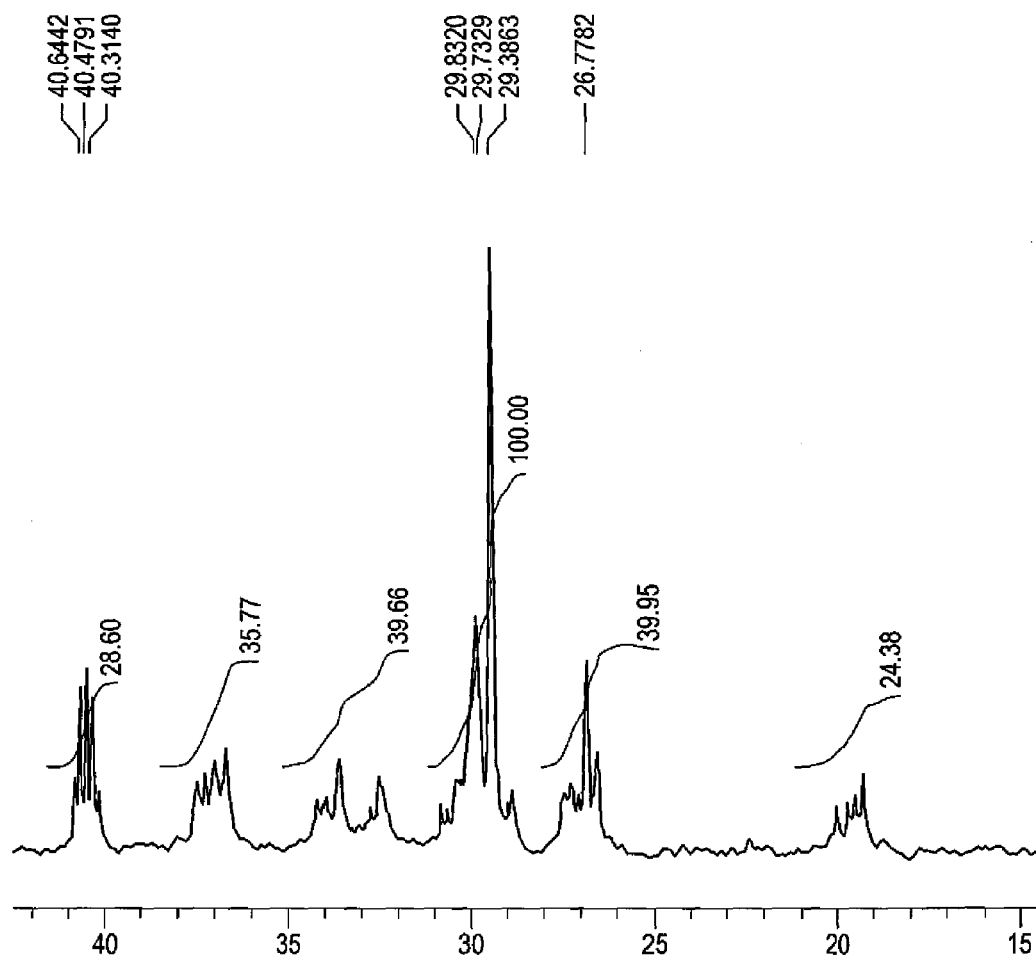
FIG. 3 shows $^{13}C$ NMR spectra of the 50/50 feed molar ratio (E/P) adhesive copolymer of the table in FIG. 1, Entry 2.
Figure 4:
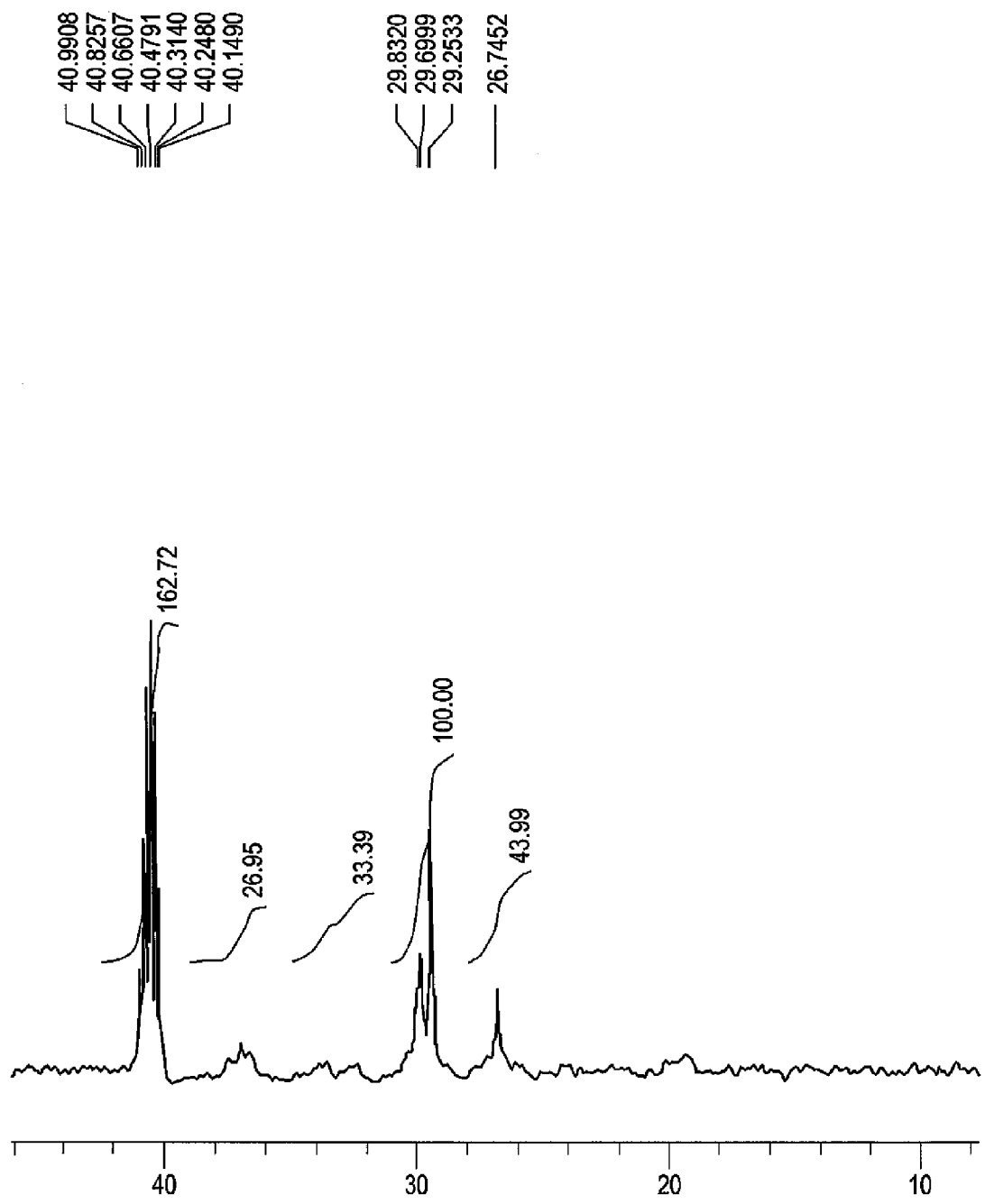
FIG. 4 shows $^{13}C$ NMR spectra of the 40/60 feed molar ratio (E/P) adhesive copolymer of the table in FIG. 1, Entry 3.

The polypropylene percent in the ethylene/propylene adhesive copolymer samples was calculated as published by Cheng, H. N., Macromolecules, 1984, 17(10), p. 1950-1955 using $^{13}$CNMR, as shown in FIGS. 2, 3 and 4. The mole percent of polypropylene (% mol) was calculated by using the following formula:

$$\% \text{ mol of Poly } C_3H_6 = \frac{2t}{s+t} = \frac{2p}{s+p} \quad (1)$$

where:

$$s = \sum_{ij} s_{ij} \quad (2)$$

$$T = \sum_{ij} T_{ij} \quad (3)$$

$$P = \sum_{ij} P_{ij} \quad (4)$$

where S, T, and P refer respectively to secondary (methylene), tertiary (methine), and primary (methyl) carbons.

Polypropylene percent was 42, 55 and 88 for 60/40, 50/50 and 40/60 feed molar ratios of ethylene/propylene, respectively, as shown in FIG. 1, Entries 1, 2 and 3.

Figure 5:
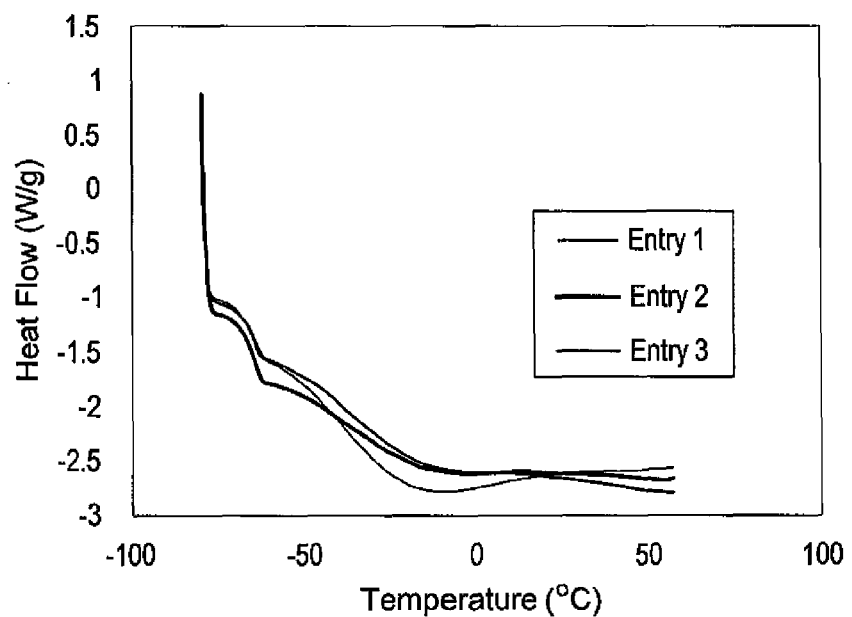
FIG. 5 shows differential scanning calorimetry (DSC) profile of the three ethylene/propylene copolymers of the table of FIG. 1.

Glass transition temperature ($T_g$) of ethylene/propylene adhesive copolymers was measured using DSC within different temperature ranges, from 30° C. to 160° C. and −30° C. to 60° C. but neither $T_g$ nor $T_m$ were observed. Finally, the cooling range was extended to −80° C. and the glass transition temperature was observed. No melting temperature ($T_m$) was observed for all samples as shown in FIG. 5.

Figure 6:
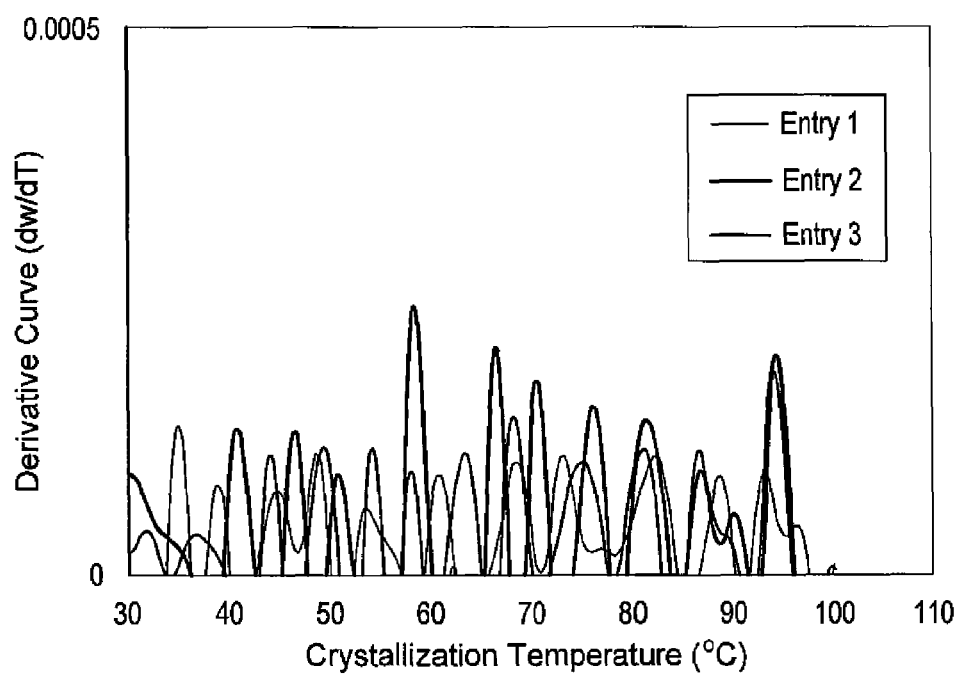
FIG. 6 shows crystallization analysis fractionation (CRYSTAF) profiles of the three ethylene/propylene copolymers of the table of FIG. 1.

Crystallization analysis fractionation (CRYSTAF) was used to confirm the results obtained by $^{13}$CNMR and DSC. CRYSTAF results showed that, ethylene/propylene pressure sensitive adhesive copolymers had amorphous structures, as shown in FIG. 6.

From Gel Permeation Chromatography (GPC) analysis, a low molecular weight of ethylene/propylene pressure sensitive adhesive copolymer was obtained for all feed molar ratios of (E/P) (Entries 1, 2 and 3 of FIG. 7). Weight average molecular weight ($M_w$) was found to increase slightly with increased propylene in the feed ratio. The polydispersity index (PDI), which is the ratio of weight average molecular weight ($M_w$) to the number average molecular weight ($M_n$), was decreased by increasing the proportion of propylene in the feed ratio (Entries, 1, 2 and 3, FIG. 7).

Figure 8:
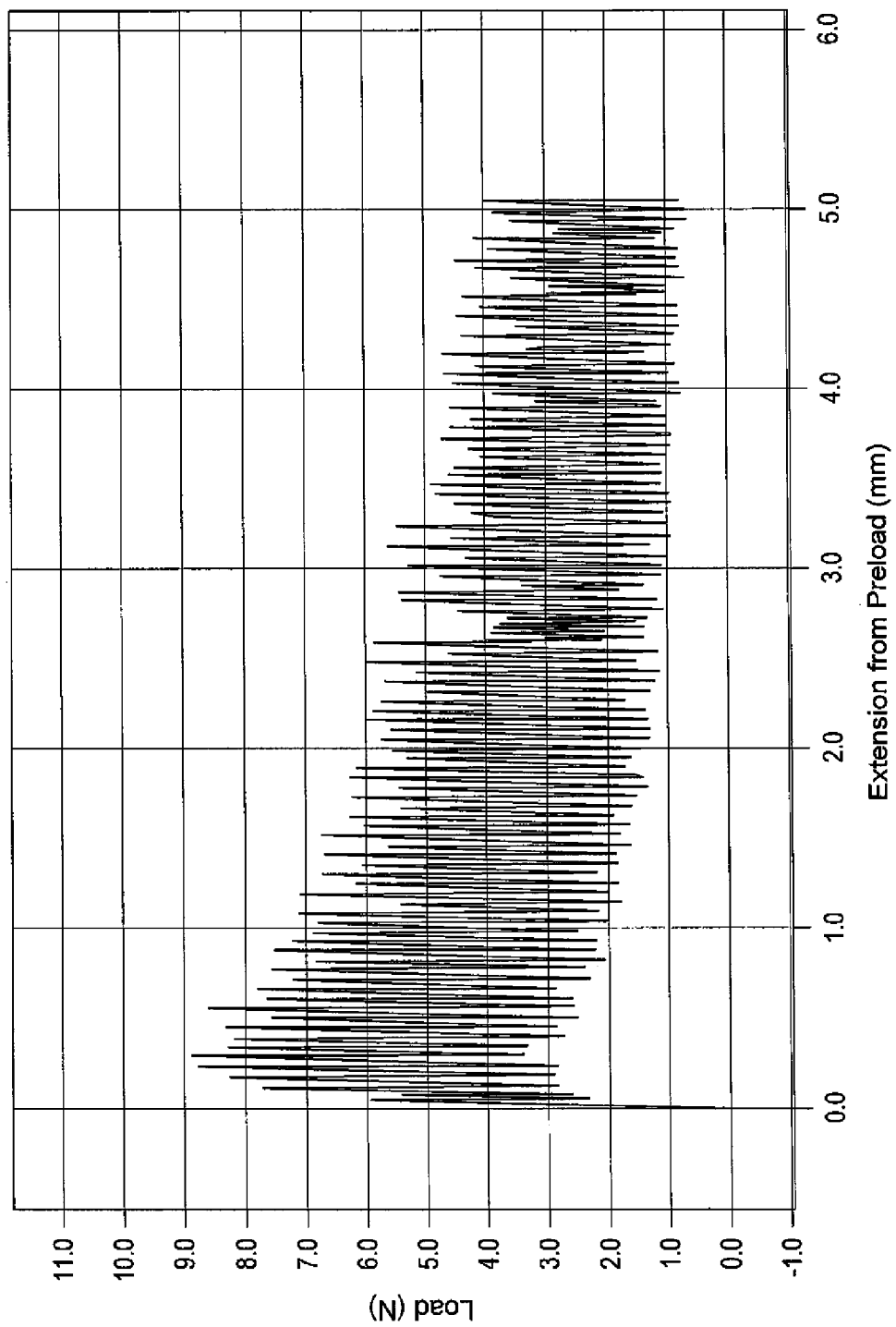
FIG. 8 is a plot of the load vs. millimeters of extension from an adhesive lap joint shear strength test of the 60/40 E/P sample copolymer (Entry 1 of the table of FIG. 1).
Figure 9:
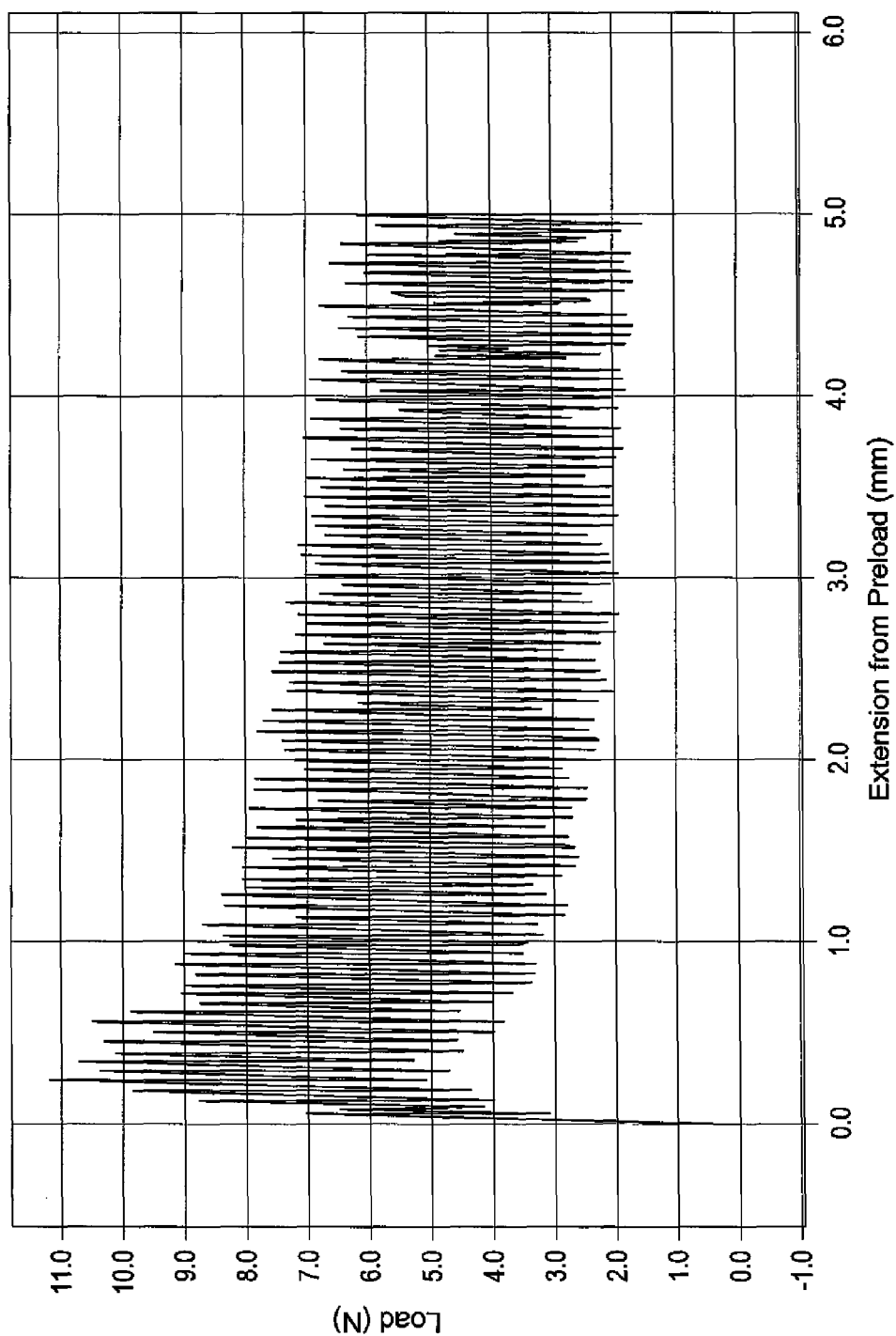
FIG. 9 is a plot of the load vs. millimeters of extension from an adhesive lap joint shear strength test of the 50/50 E/P sample copolymer (Entry 2 of the table of FIG. 1).
Figure 10:
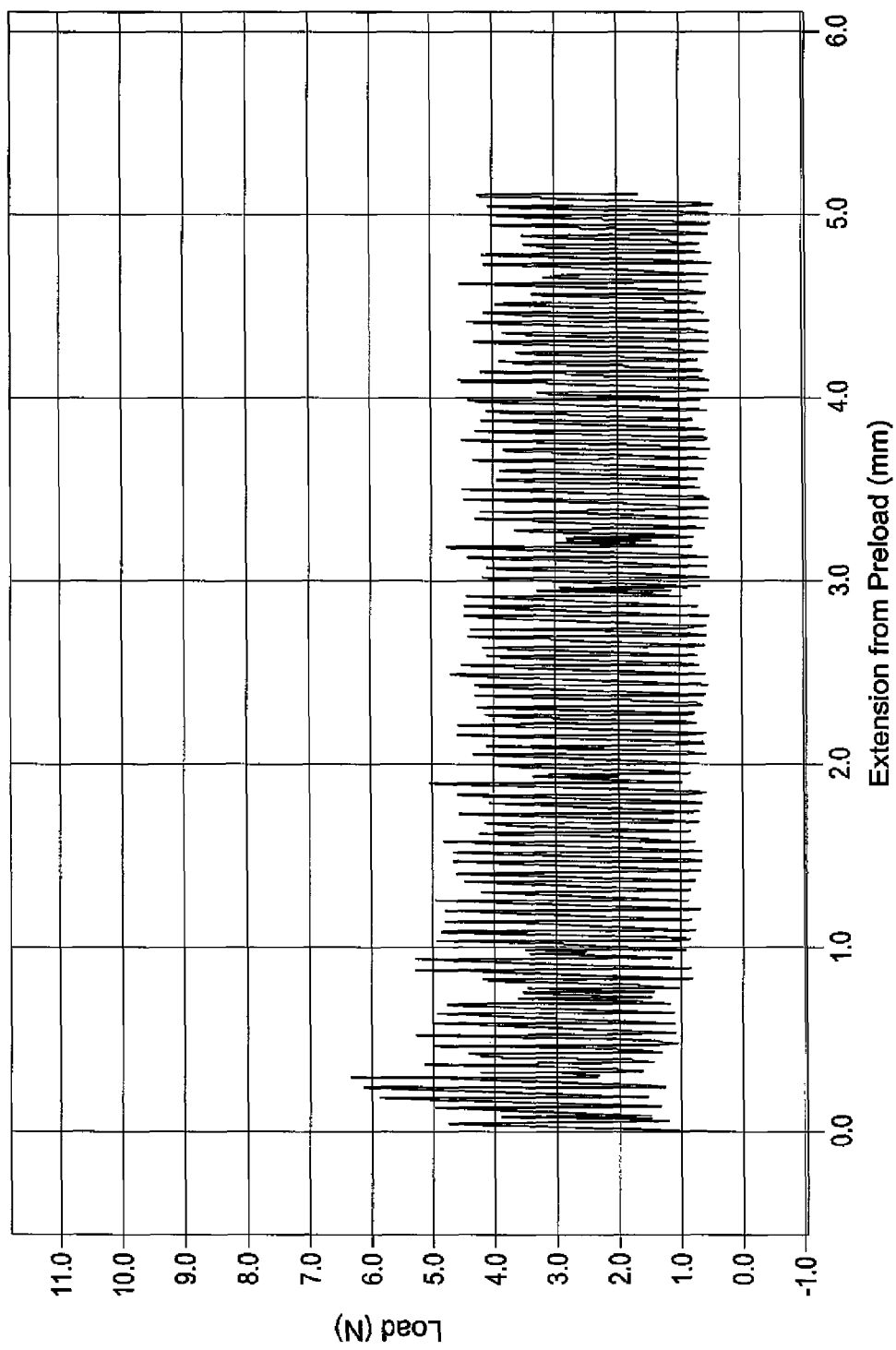
FIG. 10 is a plot of the load vs. millimeters of extension from an adhesive lap joint shear strength test of the 40/60 E/P sample copolymer (Entry 3 of the table of FIG. 1).

Adhesive lap joint shear strength tests were performed to prove the adhesive characteristics of ethylene/propylene adhesive copolymer. The results showed that there is an optimum molecular weight that gives the maximum cohesive and adhesive strength. The shear strength was increased with an increase in the molecular weight up to 27,821 Daltons, and then decreased. The maximum load increased from 8.8 N (shown in FIG. 8) for Entry 1 of the table in FIG. 7, to 11.2 N (shown in FIG. 9) for Entry 2 of the table in FIG. 7, and then it decreased to 6.4 N (shown in FIG. 10) for Entry 3 of the table in FIG. 7. The weak adhesive strength of the highest molecular weight ethylene/propylene adhesive copolymer can be attributed to the weak wettability.

It is to be understood that the present invention is not limited to the embodiments described above, but encompasses any and all embodiments within the scope of the following claims.

We claim:

1. A method of making an ethylene-propylene copolymer for use as a pressure sensitive adhesive, comprising the steps of:
   introducing a diimine nickel catalyst and toluene solvent into a reaction vessel, the catalyst having the structural formula:

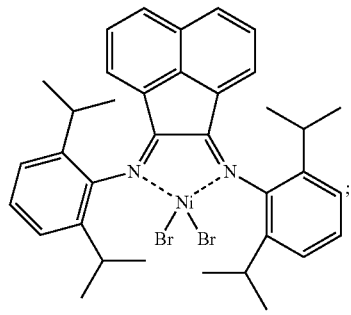

charging the reaction vessel with nitrogen gas to a pressure of 1.3 bar;
   placing the reaction vessel in an oil and equilibrating the temperature at 30° C.;
   removing the nitrogen gas from the reaction vessel;
   introducing a mixture of ethylene and propylene gases into the reaction vessel;
   adding polymethylaluminoxane (MAO) co-catalyst to the reaction vessel to initiate polymerization;
   quenching the polymerization after production of the ethylene-propylene copolymer;
   washing the copolymer;
   drying the copolymer in an oven at 50° C.

2. The method of making an ethylene-propylene copolymer according to claim 1, wherein the mixture of ethylene and propylene gases comprises an ethylene:propylene molar ratio of 40:60.

3. The method of making an ethylene-propylene copolymer according to claim 1, wherein the mixture of ethylene and propylene gases comprises an ethylene:propylene molar ratio of 50:50.

4. The method of making an ethylene-propylene copolymer according to claim 1, wherein the mixture of ethylene and propylene gases comprises an ethylene:propylene molar ratio of 60:40.

* * * * *